United States Patent [19]
Dobler et al.

[11] Patent Number: 5,687,288
[45] Date of Patent: Nov. 11, 1997

[54] SYSTEM WITH SPEAKING-RATE-ADAPTIVE TRANSITION VALUES FOR DETERMINING WORDS FROM A SPEECH SIGNAL

[75] Inventors: Stefan Dobler, Neunkirchen/Brand; Hans-Wilhelm Rühl, Röthenbach/Pegnitz, both of Germany

[73] Assignee: U.S. Philips Corporation, New York, N.Y.

[21] Appl. No.: 528,289

[22] Filed: Sep. 14, 1995

[30] Foreign Application Priority Data

Sep. 20, 1994 [DE] Germany ............... 44 33 484.2
Oct. 26, 1994 [DE] Germany ............... 44 38 185.4

[51] Int. Cl.⁶ .................... G10L 5/06; G10L 9/06
[52] U.S. Cl. ............... 395/2.64; 395/2.5; 395/2.53; 395/2.62; 395/2.63
[58] Field of Search ................ 395/2.47, 2.48, 395/2.5, 2.53, 2.62, 2.63, 2.64

[56] References Cited

U.S. PATENT DOCUMENTS

| 4,667,341 | 5/1987 | Watari ............... 395/2.48 |
| 4,783,803 | 11/1988 | Baker et al. ......... 395/2.61 |
| 4,792,976 | 12/1988 | Watari ............... 395/2.52 |
| 4,803,729 | 2/1989 | Baker ................ 395/2.5 |
| 4,813,075 | 3/1989 | Ney .................. 395/2.25 |
| 5,058,166 | 10/1991 | Ney et al. ........... 395/2.63 |
| 5,164,990 | 11/1992 | Pazienti et al. ...... 395/2.62 |
| 5,170,432 | 12/1992 | Hackbarth et al. ..... 395/2.63 |
| 5,208,897 | 5/1993 | Hutchins ............. 395/2.09 |

FOREIGN PATENT DOCUMENTS

0614172A2 9/1994 European Pat. Off. ....... G10L 5/06

OTHER PUBLICATIONS

Hiroaki Sakoe, "Dynamic Programming-Based Speech Recognition Algorithms", in Advances in Speech Signal Processing, edited by Sadaoki Furui and M. Mohan Sondhi, chapter 16, Marcel Dekker, Inc., pp. 487–507, 1992.

*Primary Examiner*—Allen R. MacDonald
*Assistant Examiner*—Tálivaldis Ivars Šmits
*Attorney, Agent, or Firm*—Daniel E. Tierney

[57] ABSTRACT

Speech recognition produces test signals from the speech signal which are compared with predetermined reference signals so as to form scores. Each subsequent test signal is compared with reference values which are situated within a predetermined neighborhood of the reference value which has been determined to be optimum for the preceding test signal. In dependence on this neighborhood, transition values in conformity with the transition probabilities are added to the scores. In order to enhance the results notably in the case of different speeds of speaking of the instantaneous speaker, it is proposed to adapt these transition values in dependence on the speed of speaking. A further improvement can be achieved by also adapting the reference values themselves to the relevant speaker's pronunciation. This adaptation can also be iteratively performed in a number of steps.

7 Claims, 2 Drawing Sheets

SYSTEM WITH SPEAKING-RATE-ADAPTIVE TRANSITION VALUES FOR DETERMINING WORDS FROM A SPEECH SIGNAL

BACKGROUND OF THE INVENTION

The invention relates to a system for determining words of a predetermined vocabulary from a speech signal, comprising first means for picking up the speech signal and for supplying a sequence of digital test signals, second means for storing sequences of reference signals which correspond to the words of the vocabulary, third means which are coupled to the first and the second means in order to compare the test signals with first reference signals so as to form a score for each first reference signal which is dependent on the difference between the test signal and the first reference signal, the first reference signal being identical to or a neighbour, in a predetermined manner, of a second reference signal within the relevant sequence with which a comparison has been successfully performed for the preceding test signal, the third means being arranged to increment, in dependence on the distance from said second reference signal, the score by a transition value which is dependent on the probability of transition, fourth means for summing the incremented scores for each sequence of reference signals compared with successive test signals, and for determining an optimum sequence having the smallest sum of the incremented scores and for outputting the word or the words associated with said optimum sequence.

A system of this kind is known from DE 32 15 868 C2. The known system serves notably for the determination of word sequences where corresponding sequences of reference signals are stored for the individual words and special steps are taken so as to determine word transitions. The comparisons of the successive test signals with the reference signals, or their results, can be represented in a two-dimensional grid in which for each sequence of reference signals originating from the starting point with which successive test signals from the starting point were compared within the word it is determined which reference signal produces, in conjunction with the next test signal, the smallest sum of the scores in order to find a path in the grid from a given starting point in a word to the end of this word. Therefore, within the word a next test signal is compared with such reference values which are situated within a given neighbourhood around the end of the path just reached. In this manner a non-linear temporal adaptation is achieved between the actually spoken word and the sequence of reference values of this word. Within a word, the various transitions i.e. the neighbourhood of the reference value found to be optimum for a test signal to the optimum reference value found for the preceding test signal, are treated in an equivalent manner.

DE 37 10 507 A1 discloses a similar system for the recognition of spoken words in which the different neighbourhood of the optimum reference signals for successive test signals is taken into account. The transition probabilities are thus explicitly modelled. In particular a fixed transition value is added to the score in dependence of said neighbourhood. It is assumed that the score is formed by the negative logarithm of the probability that the word actually spoken in this location corresponds to the relevant reference signal.

Preference can be given to a diagonal course of the path by way of an appropriate choice of the transition values, because such a diagonal path is most probable, because the speed at which a word is spoken then corresponds to the sequence of the reference signals. Words can thus be recognized also in the case of different manners of speaking, be it with a different score. The speed of speech is thus modelled by the choice of the transition values.

The reference values are determined on the basis of test sentences which must be spoken prior to the actual use of the system. When the system is intended for a given user, these test sentences are recorded for the user only. The speed of speech is thus modelled at the same time. However, when the system is intended for a plurality of users or, as in the ideal case, should be completely independent of the speaker, the reference values can be derived from test sentences spoken by a number of different speakers. Mean values are then determined for the reference values themselves as well as for the transition values, said mean values being assumed to be the same for all locations within all words. However, this results in a reduced recognition reliability because when a speaker speaks, for example very fast so that the optimum path of the reference signals through the word is steeper than the diagonal, the transition values overall produce a less attractive score and the word spoken can be more readily mistaken for similarly sounding reference words.

SUMMARY OF THE INVENTION

It is an object of the invention to provide a system of the kind set forth which offers a higher reliability for use by various speakers.

This object is achieved in accordance with the invention in that there are provided fifth means for changing the transition values into new transition values for subsequent comparisons, in dependence on the deviation between the length of the speech signal wherefrom the test signals compared with the optimum sequence of reference values are derived and the length of the optimum sequence of reference signals.

Thus, by adaptation of the transition values the sequence of reference signals in the system in accordance with the invention is adapted to the speed at which the instantaneous user speaks. As soon as a word has been recognized and possibly acknowledged, the transition values can be adapted so that subsequent words are more reliably recognized.

A suitable possibility for adaptation of the transition values in accordance with the invention consists in that the fifth means are arranged to change the transition values a, in dependence on the ratio $$n = \frac{T}{N}$$

where T is the length of the sequence of test signals and N is the length of the sequence of reference signals, into new transition values a' as follows:

$a'_{i,i} = a_{i,i} - (n-1)b$ $a'_{i,i+1} = a_{i,i+1}$ $a'_{i,i+2} = a_{i,i+2} + (n-1)b$, in which the index i,i means that the first reference signal equals the second reference signal, the index i,i+1 means that the first and the second reference signals are direct neighbours, the index i,i+2 means that the first and the second reference signals are separated by a further reference signal, and b means a predetermined proportionality factor.

The ratio of the length of the actually spoken word to the length of the sequence of reference signals is thus used to change the transition values in such a manner that the overall transition probability remains constant for all transitions in favouring the one deviation from the diagonal to the same extent as that whereby the other deviation from the diagonal is suppressed.

Taking into account the real speed of speaking of the actual user of the system in this manner substantially improves the recognition reliability.

A further improvement is achieved in an embodiment of the invention in which there are provided sixth means for changing the reference values $r_i$ into new reference values $r'_i$ as follows:

$$r'_i = r_i(1-c) + c \cdot y_t$$

where $y_t$ is the test signal compared with the reference value $r_i$ in the optimum sequence of reference values, and c is a predetermined value. Thus, not only the speed of speaking is taken into a account, but also the intonation, i.e. the vocal tract of the speaker. This adaptation of the reference values to an instantaneous speaker is known in principle, but not in conjunction with the adaptation to the speed of speaking.

The adaptation to the speed of speaking and possibly the pronunciation of the instantaneous speaker should be carried out cautiously, because it should not take place for incidental extreme values in a single word or a few words spoken by the instantaneous speaker in a particular manner, since the same speaker could subsequently change his or her way of speaking. The degree of adaptation can be implemented for the speed of speaking by the proportionality factor b and possibly for the changing of the reference values themselves by the predetermined value c; these two quantities should not be too large. However, in order to enable suitable adaptation nevertheless to the way of speaking of the instantaneous speaker, in a further embodiment of the invention at least the changing of the reference values within the same speech signal is performed several times. Step-by-step adaptation to the way of speaking of the instantaneous speaker will thus be achieved after several recognized words.

BRIEF DESCRIPTION OF THE DRAWINGS

Embodiments of the invention will be described in detail hereinafter with reference to the drawing. Therein.

DESCRIPTION OF THE PREFERRED EMBODIMENTS

Figure 1:
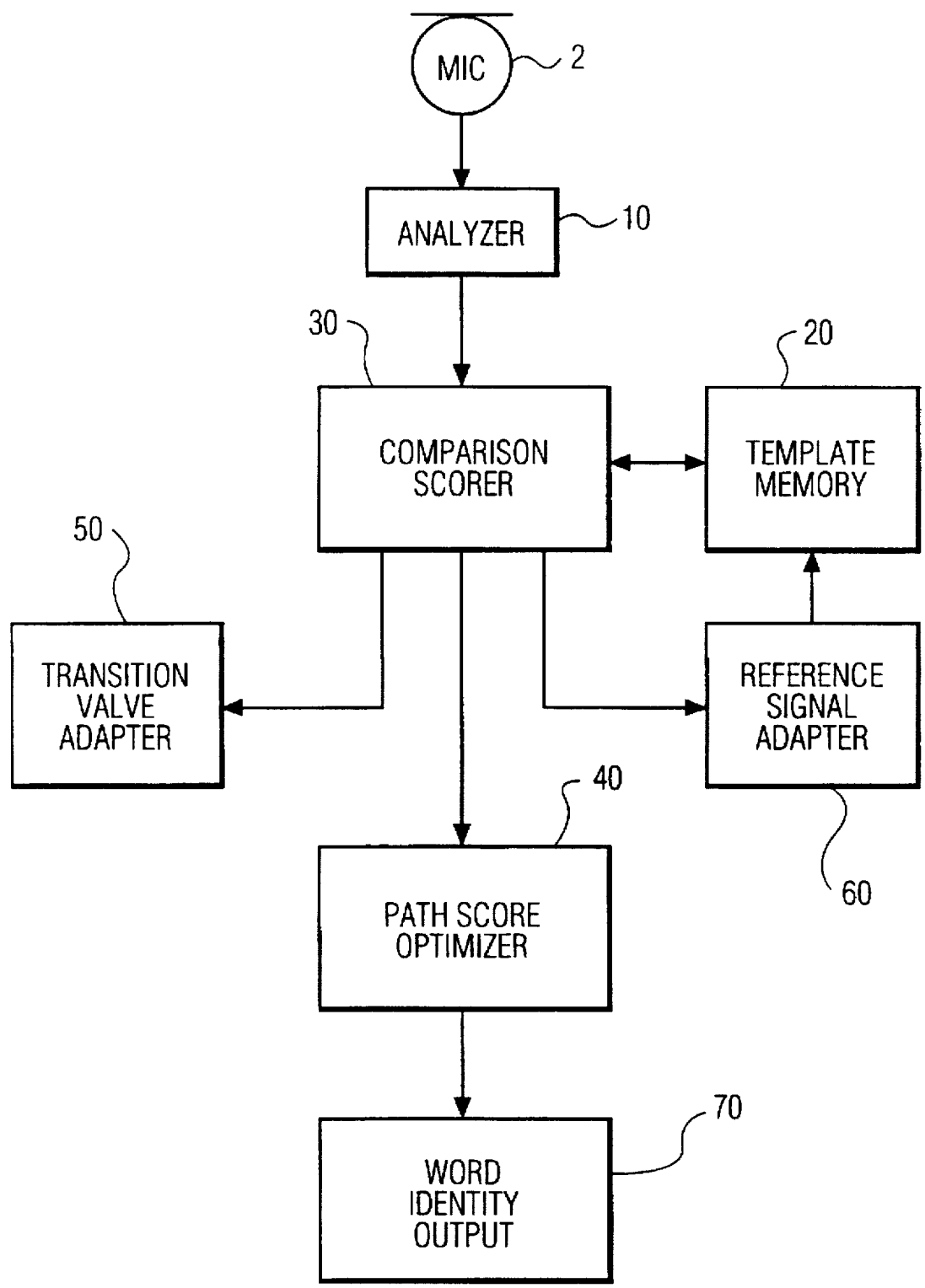
FIG. 1 shows a block diagram of the system in accordance with the invention.

The block diagram of FIG. 1 indicates a microphone 2 which is intended to convert an acoustic signal spoken by a speaker into an electric signal. This signal is further processed in the block 10 in that it is digitized and, for example the individual frequency components of the speech signal are determined in segments. The length of such segments is, for example a uniform value between 10 ms and 20 ms. The block 10 outputs the test signals to the block 30.

In the block 30 the test signals are compared with reference signals which are supplied by a memory 20 which is controlled and addressed by the block 30. These reference signals have been determined in advance by analysis of test sentences spoken by preferably several different speakers. The comparisons produce scores which are incremented by transition values which are stored in the block 30. In the block 40 the incremented scores are summed for various paths through different words. This summing, however, can also take place simultaneously with the comparisons for the determination of the scores. At the end of a word, or at the end of a speech signal which may also comprise several words, the optimum overall path is determined in the block 40 and the corresponding word sequence is output to the block 70. This may be, for example a display screen; however, it is preferably formed by a device which is to be controlled by speech commands.

Figure 2:
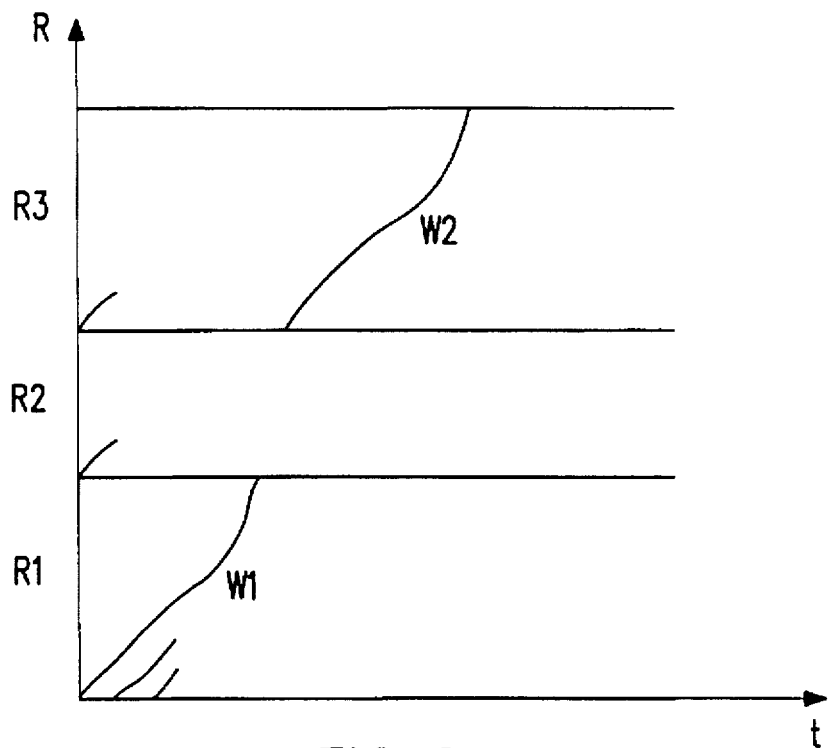
FIG. 2 shows a diagram illustrating the formation of paths through successive words.

The comparison of successive test signals with reference signals of different words and the determination of the optimum sequence will be described in detail hereinafter with reference to FIG. 2. The time axis t represents the sequence of test signals determined from the speech signal received whereas the axis R represents the sequence of reference signals for a plurality of words which are arranged one over the other for the sake clarity. FIG. 2 shows that the first test signals correspond best to the sequence R1 of reference signals associated with a word W1. Comparisons with the beginnings of other sequences R2 and R3, associated with other words, are also started each time; however, it is assumed herein that the similarity is so small that these series of comparisons are quickly terminated. Generally speaking, with the subsequent test signals, therefore, new comparisons with, for example the sequence R1 of test signals start again; however, these comparisons also quickly terminated, because the parts of the speech signal which are spoken later deviate too much from the beginning of the sequence R1 of reference signals.

After termination of the path through the sequence R1 of reference signals, this path thus corresponding to a word W1, the comparisons with the beginnings of the sequences R1 to R3 of reference signals are continued and in this example it is assumed that the path then commencing through the sequence R3 of reference signals results in the optimum path or sub-path, so that subsequently a word W3 is output as having been recognized. The comparisons are continued analogously when the speech signal lasts longer because more words are spoken.

Figure 3:
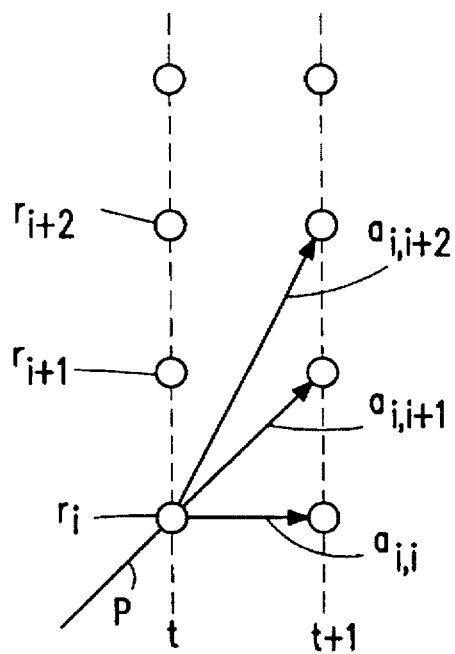
FIG. 3 shows a diagram illustrating the transitions for two successive test signals.

The events occurring during the execution of the comparisons within a word will be described in detail with reference to FIG. 3 which shows a small detail of FIG. 2, i.e. for two successive test signals only at the instants t and t+1, together with some reference signals $r_i$, $r_{i+1}$, $r_{i+2}$ etc. It is assumed that with the test signal at the instant t the optimum path P has terminated for the time being at the reference value $r_i$. The next test signal, at the instant t+1, is then compared with the reference signals $r_i$, $r_{i+1}$ and $r_{i+2}$ in conformity with the permitted transitions $a_{i,i}$, $a_{i,i+1}$ and $a_{i,i+2}$ with which correspondingly designated transition values are associated. In the present example these transition values correspond to the negative logarithm of the transition probabilities. The comparison of the test signal at the instant t+1 with the reference signal $r_i$ results in a score which is dependent on the difference between the two signals and which is incremented by the transition value $a_{i,i}$. Analogously, the comparison of this test signal with the reference signal $r_{i+1}$ produces a score which is incremented by the transition value $a_{i,i+1}$. Analogously, the comparison of this test signal with the reference signal $r_{i+2}$ produces a score which is incremented by the transition value $a_{i,i+2}$. The transition values $a_{i,i}$ and $a_{i,i+2}$, for example, are equal or deviate only little, whereas the transition value $a_{i,i+1}$ is substantially smaller. When the test signal at the instant t+1 exhibits approximately the same difference with respect to all three reference signals shown, which is quite feasible because neighbouring reference values are often similar, the smallest score incremented by the transition value will result from the comparison with the reference value $r_{i+1}$, so that the path P terminated at the reference value $r_i$ is continued in the diagonal direction. This diagonal direction is, therefore, privileged.

In the case of a fast speaker, the test signal at the instant t+1 would be more similar to the reference value $r_{i+2}$. However, if the transition value $a_{i,i+2}$ is too much larger than the transition value $a_{i,i+1}$, the diagonal direction could be unduly imposed. If this occurs repeatedly within the word, i.e. within the sequence of reference signals, ultimately a sum of scores will be obtained which is less attractive than would be appropriate for the good similarity, except for the excessively fast speech, between the sequence of test signals and the sequence of reference signals. Overall this results in a less reliable recognition. Therefore, as soon as it has been established that the speaker speaks too fast or too slow to a given extent, the transition values are advantageously changed so as to privilege a direction which deviates from the diagonal in the same sense.

This adaptation is performed as follows in block 50 in FIG. 1.

When a word or a short sequence of words has been recognized, i.e. a path leading to the end of the relevant sequence has been determined in at least one sequence of reference signals, it is known how many test signals were required for this purpose. Because the number of reference signals of this sequence is given, the ratio n can be calculated:

$$n = \frac{T}{N}$$

Therein, T is the number of test signals with which the word has been recognized and N is the number of reference signals in the relevant sequence. Using this ratio n, new transition values a' are determined from the transition values a present:

$a'_{i,i} = a_{i,i} - (n-1)b$ $a'_{i,i+1} = a_{i,i+1}$ $a'_{i,i+2} = a_{i,i+2} + (n-1)b$.

The proportionality factor b therein determines the degree of adaptation of the transition values to the way of speaking of the speaker. In order to ensure that this adaptation will not be overly dependent on incidental extreme values in the way of speaking of the speaker, the value b should not be too large. It has been found that a value b=180 is a suitable compromise when the transition values a are represented, as already stated, by the negative logarithm of the transition probabilities. The transition value for the diagonal is thus kept constant independently of this value, since in the case of fast speech the steeper transition value $a_{i,i+2}$ is reduced to an extent which is the same as the extent whereto the transition value for the less steep transition $a_{i,i}$ is increased. As a result, overall a steeper transition between the reference signals for successive test signals is privileged. The same holds for slow speech. The new transition values are transferred to the block 30 in which they are used for the subsequent comparisons.

The recognition reliability can be improved further by adapting the reference signals themselves to the speaker's pronunciation. This is realised as follows in block 60 in FIG. 1.

After a word has been recognized in the described manner, the test signals are compared again, be it with the sequence of reference signals in which previously the optimum path was found; each reference signal $r_i$ is converted into an adapted reference signal $r'_i$ as follows:

$r'_i = r_i(1-c) + c \cdot y_t$

Therein, $y_t$ is the test signal compared with the reference signal $r_i$ at the instant t and the factor c indicates the extent whereto the current reference signal has been changed. It has been found that a value c=0.13 is effective, notably when the reference signals are adapted in a plurality of steps with successive words.

It has been assumed thus far that a sequence of reference signals represents a respective word. However, there are also speech recognition systems in which the individual sequences of reference signals represent phonemes which may be the same in many words. Words are then formed from the recognized phonemes. The described method for adapting the transition values and possibly the reference signals is also suitable for use in such systems.

Furthermore, the method can also be used if, as opposed to said embodiment, the transition values are not the same for all reference signals but deviate from one another in dependence on the position of the reference signal within the sequence. The adaptation factor b must then be determined in a position-dependent manner, if necessary.

We claim:

1. A system for determining words of a predetermined vocabulary from a speech signal, comprising first means for picking up the speech signal and for supplying a sequence of digital test signals, second means for storing sequences of reference signals which correspond to the words of the vocabulary, third means which are coupled to the first and the second means in order to compare the test signals with first reference signals so as to form a score for each first reference signal which is dependent on the difference between the test signal and the first reference signal, the first reference signal being identical to or a neighbour, in a predetermined manner, of a second reference signal within the relevant sequence with which a comparison has been successfully performed for the preceding test signal, the third means being arranged to increment, in dependence on the distance from said second reference signal, the score by a transition value which is dependent on the probability of transition, fourth means for summing the incremented scores for each sequence of reference signals compared with successive test signals, and for determining an optimum sequence having the smallest sum of the incremented scores and for outputting the word or the words associated with said optimum sequence, characterized in that there are provided fifth means for changing the transition values into new transition values for subsequent comparisons, in dependence on the deviation between the length of the speech signal wherefrom the test signals compared with the optimum sequence of reference signals are derived and the length of the optimum sequence of reference signals.

2. A system as claimed in claim 1, characterized in that the fifth means are arranged to change the transition values a, in dependence on the ratio $$n = \frac{T}{N}$$

where T is the length of sequence of test signals and N is the length of the sequence of reference signals, into new transition values a' as follows:

$$a'_{i,i} = a_{i,i} - (n-1)b$$

$$a'_{i,i+1} = a_{i,i+1}$$

$$a'_{i,i+2} = a_{i,i+2} + (n-1)b,$$

in which the index i,i means that the first reference signal equals the second reference signal, the index i,i+1 means that the first and the second reference signals are direct neighbours, the index i,i+2 means that the first and the second reference signals are separated by a further reference signal, and b means a predetermined proportionality factor.

3. A system as claimed in claim 2, characterized in that there are provided sixth means for changing the reference values $r_i$ into new reference values $r'_i$ as follows:

$$r'_i = r_i(1-c) + c \cdot y_t$$

where $y_t$ is the test signal compared with the reference value $r_i$ in the optimum sequence of reference values, and c is a predetermined value.

4. A system as claimed in claim 2, characterized in that at least the changing of the reference values within the same signal is performed several times.

5. A system as claimed in claim 1, characterized in that there are provided sixth means for changing the reference values $r_i$ into new reference values $r'_i$ as follows:

$$r'_i = r_i(1-c) + c \cdot y_t$$

where $y_t$ is the test signal compared with the reference value $r_i$ in the optimum sequence of reference values, and c is a predetermined value.

6. A system as claimed in claim 5, characterized in that at least the changing of the reference values within the same signal is performed several times.

7. A system as claimed in claim 1, characterized in that at least the changing of the reference values within the same speech signal is performed several times.

\* \* \* \* \*